United States Patent [19]

Nonemaker

[11] Patent Number: 5,275,504
[45] Date of Patent: Jan. 4, 1994

[54] GLASS BEAD APPLICATION SENSOR SYSTEM

[75] Inventor: Richard K. Nonemaker, Williamsport, Pa.

[73] Assignee: Linear Dynamics, Inc., Montgomery, Pa.

[21] Appl. No.: 697,440

[22] Filed: May 9, 1991

[51] Int. Cl.$^5$ .............................................. E01C 23/16
[52] U.S. Cl. ........................................ 404/72; 404/94; 156/560
[58] Field of Search ................ 404/14, 72, 75, 93, 404/94; 221/6; 156/560

[56] References Cited

U.S. PATENT DOCUMENTS

| | | |
|---|---|---|
| 2,821,890 | 7/1954 | Wilson . |
| 3,046,854 | 7/1962 | Wilson . |
| 3,057,273 | 11/1957 | Wilson . |
| 3,286,605 | 9/1964 | Wilson, et al. . |
| 3,326,098 | 6/1967 | Boettler . |
| 4,279,534 | 7/1981 | Eigenmann ................. 404/94 X |
| 4,319,742 | 3/1982 | Ulseth ............................ 221/6 X |
| 4,462,547 | 7/1984 | Metz . |
| 4,856,931 | 8/1989 | Bollag . |
| 4,870,806 | 10/1989 | Sprenger ........................ 221/6 X |

*Primary Examiner*—William P. Neuder
*Attorney, Agent, or Firm*—Cushman, Darby & Cushman

[57] ABSTRACT

A device and method for marking a horizontal surface, such as a roadway, and applying reflective particles to the marked surface. The device monitors the flow of the reflective particles and warns an operator when the flow is interrupted. This device prevents remarking of the surface caused by interruptions in the flow of particles.

15 Claims, 2 Drawing Sheets

GLASS BEAD APPLICATION SENSOR SYSTEM

BACKGROUND OF THE INVENTION

1. Field of the Invention

This invention relates to an apparatus for applying glass beads to a surface. More particularly, this invention relates to a sensor for a glass bead application system which monitors the application of glass beads to a road.

2. Description of the Prior Art

The use of glass beads in marking a surface is well known as can be seen in U.S. Pat. Nos. 2,821,890; 3,057,273; 3,286,605; and 4,856,931.

U.S. Pat. No. 2,821,890 to Wilson teaches marking a road or highway surface with a coating material having small particles intimately mixed therewith. The small particles are made of a reflective material, for example, glass spheres, that have an auto-collimating that is effective in outlining traffic lanes during the evening when headlights or overhead lights reflect from the striping. However, this patent does not provide any means for monitoring the supply of reflective material. Hence, it is possible that the device could run out of the reflective particles, but marking of the roadway would continue as the person utilizing the equipment may not be aware that the flow of reflective material has ceased.

U.S Pat. No. 3,057,273, also to Wilson, suffers from the same deficiency as the device described above. That is, without means to monitor the supply of reflective material, it is quite possible that the roadway could be marked with a paint having no reflective particles combined therewith. This deficiency is particularly evident where the reflectivity of the marker is produced immediately upon application with a spray gun that ejects glass spheres onto the painted marker. These spheres are larger in size than those which are admixed to the paint itself. Where the topical application of reflective particles ceases, markings are produced which are not reflective until highly worn to thus expose the smaller particles premixed with the paint.

Wilson et al., U.S. Pat. No. 3,286,605, teaches an apparatus and a method for marking the surface of a road. This patent suffers from the same problem as the two Wilson patents discussed above. That is, there is no way of monitoring the stream produced by spray gun, and it possible that the supply of glass particles will cease, unnoticed, resulting in only paint being applied to the roadway.

Even further, U.S. Pat. No. 4,856,931 to Bollag teaches a device that lays a marking line. The line is first sprayed on the surface by spray gun. The painted is has reflective beads mixed therein. Subsequent to the painting of the line, reflective beads are applied with the beads adhering to the painted line. However, no device or method is suggested for monitoring the supply or flow of the reflective beads.

SUMMARY OF THE INVENTION

Hence, it is an object of the present invention to provide an apparatus including means for monitoring the flow of glass particles to thereby alert the worker laying the markings when the flow of particles has stopped. This will prevent the laying of long stretches of markings without reflective particles applied thereto and consequently reduced visibility of the markings and/or reapplication of paint and particles.

The present invention provides a device and method for monitoring the flow of glass beads being applied to a surface. The device includes a sensor, preferably infrared, positioned proximate an outlet of and of a "glass gun" that supplies beads to a surface. In accordance with the invention, beads are directed to a freshly applied painted marking and thereby mix with the paint to enhance reflectivity in wet or evening conditions. The sensor sends signals to a junction box, which may receive other electrical signals from other elements of the applicator. A signal is sent to the junction box whenever the flow of beads through the glass gun stops, such as when the bead supply is empty or there is a blockage of the glass gun.

From the junction box, the signal from the sensor is directed to a monitor which can be easily observed by an individual operating the system. When the monitor indicates that glass beads are not flowing, usually via indicator lights mounted on a display panel, the operator can shut down the system and replenish the bead supply or eliminate any blockages from the glass gun.

Other objects, features and characteristics of the present invention as well as the method of operation of the interrelated parts of the structure will become apparent upon consideration of the following description and the appended claims with reference to the accompanying drawings, all of which form a part of this specification.

BRIEF DESCRIPTION OF THE DRAWING

The present invention is explained below with reference to the attached drawings, wherein like reference numerals designate corresponding parts.

DETAILED DESCRIPTION OF THE PRESENTLY PREFERRED EXEMPLARY EMBODIMENT

Figure 1:
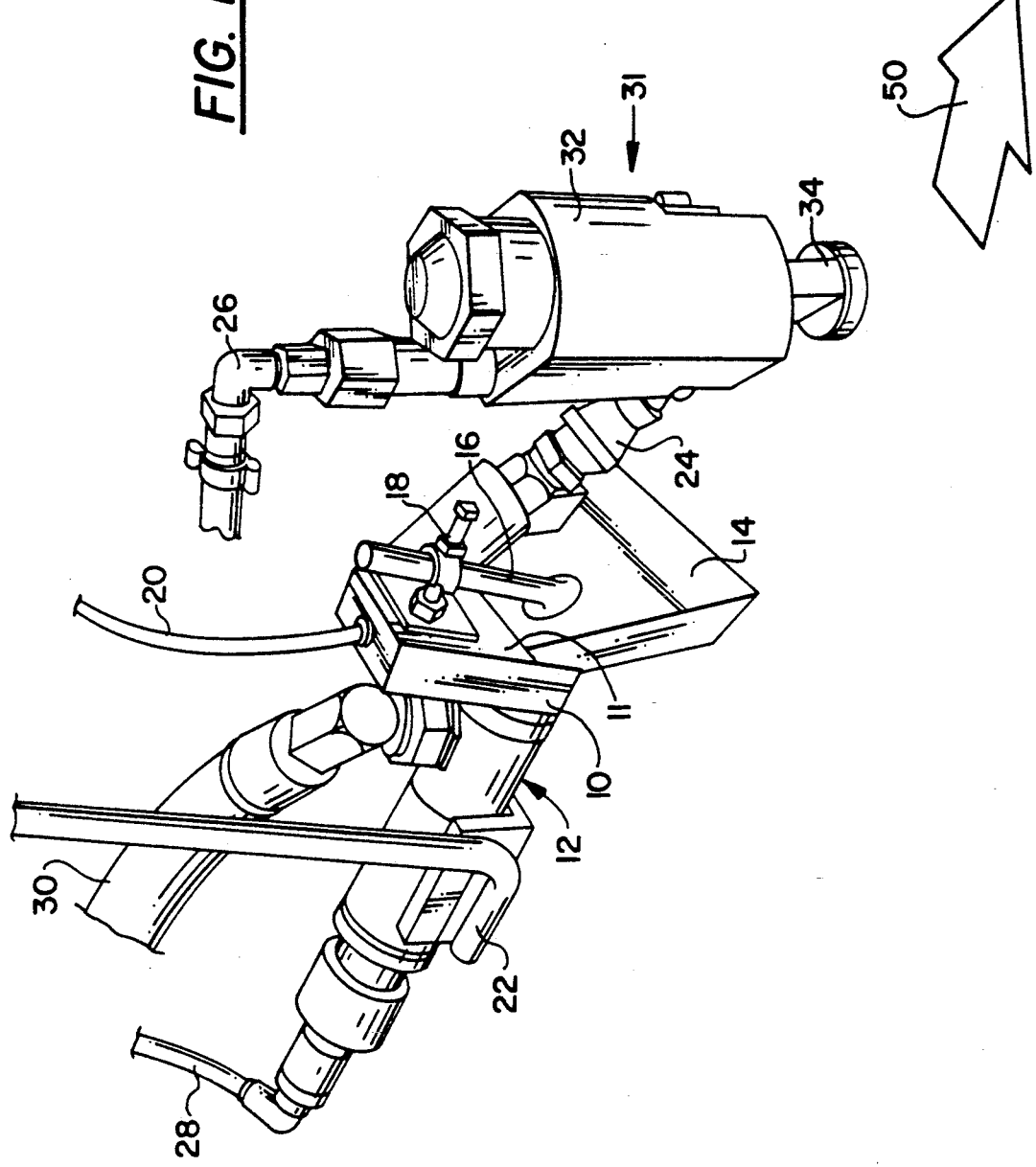
FIG. 1 schematically illustrates the present invention mounted on a surface marking system.

FIG. 1 illustrates the present invention used in a surface marking mechanism. Glass gun 12 is held by a support 22. Support 22 is generally suspended from the underneath of a vehicle or other device used to place marks on horizontal surfaces such as roads. Glass gun 22 generally propels reflective beads (not shown in particular) out of exit end 13 (FIG. 2) of gun 12. Generally, the beads are propelled using compressed air that is supplied to gun 12 through tubing 28. Tubing 28 extends to a source of compressed air (not shown) that is mounted on the vehicle or other device used to place marks on horizontal surfaces such as roads. The source of glass, or other suitable reflective material, beads is also mounted away from gun 12. The beads are supplied from the bead reservoir through tubing 30. Infrared sensor 10 is mounted adjacent exit end 13 to monitor the flow of reflective beads. When the flow is interrupted because the gun is blocked or because no beads are being fed to gun 12, a signal is sent to junction box 42 from sensor 10 (FIG. 3) via transmission line 20. The beam produced by infrared sensor 10 is normally broken by the flow of beads when the designated gun is energized, but when the flow is interrupted, the beam is unbroken, thus completing a circuit and enabling a signal to be sent from sensor 10.

Figure 2:
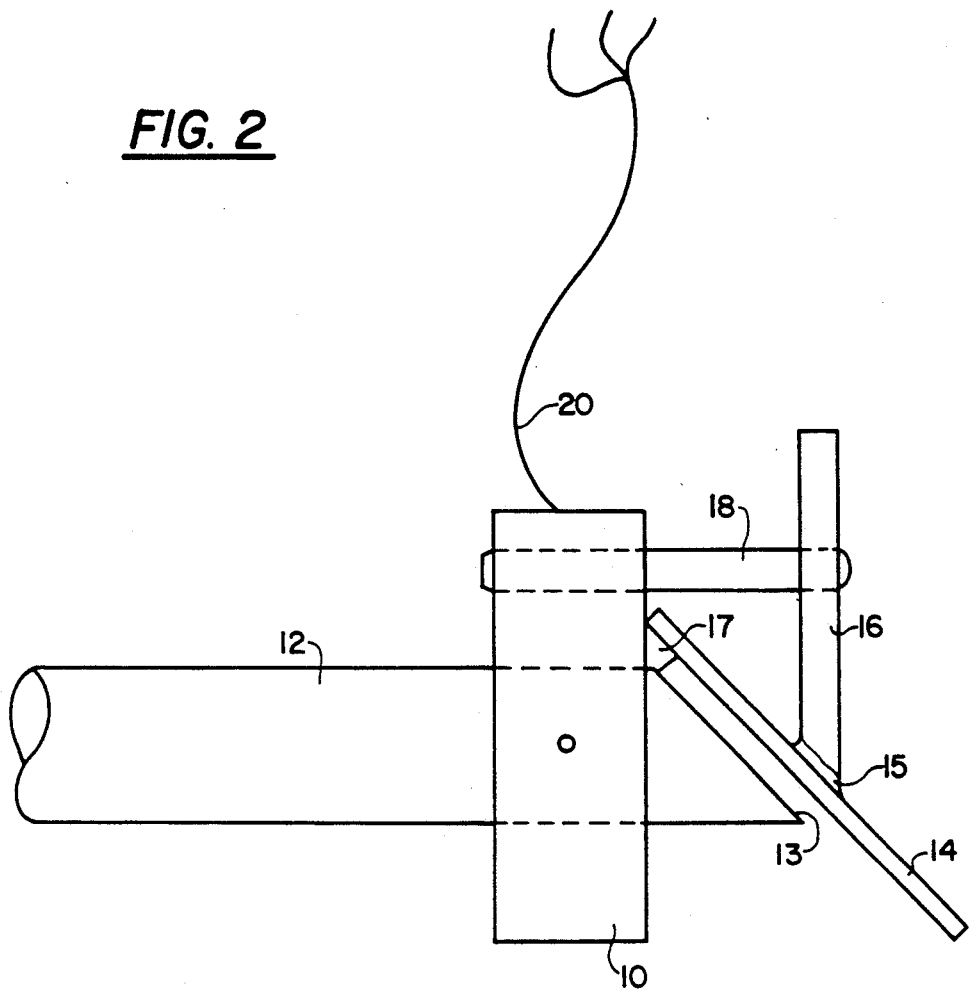
FIG. 2 is a schematic view of the present invention, enlarged from FIG. 1.

More particularly, directional deflector 14 is mounted to exit surface 11 of sensor 10. As can be seen in FIG. 2, deflector plate 14 is mounted to sensor 10 using a weld 17. Deflector plate 14 is further held by supports 16 and 18, with support 16 being welded via weld 15 to plate 14 and with support 18 being mounted to sensor 10.

In front of the gun/sensor/plate assembly is mounted a paint gun assembly 31. In front as used herein means downstream in the direction indicated by arrow 50. Arrow 50 indicates the direction in which the marking apparatus or vehicle is advancing. Paint is supplied to paint gun assembly 31 via tubing 24. The paint supply (not shown) is disposed on the marking vehicle and fed through tubing 24.

The paint is also propelled by compressed air, in a similar fashion to the glass beads. The compressed air may be fed from the same source that feeds gun 12, although separate sources might be used if desired. The compressed air enters the paint gun assembly via tubing 26. Tubing 26 connects to the upper end of paint mixing vessel 32. Of course, it is also possible to pump the paint to gun 12.

The paint that is applied to the horizontal surface is jetted towards the surface through output nozzle 34. Output nozzle 34 produces a paint spray that has a desired width, such as the width of a line on a highway.

Note that FIG. 2 depicts that deflector 14 is angled downward toward the horizontal surface. This angle is set so that the beads hit the horizontal surface after the paint gun has already applied a mark to the surface. It is disadvantageous to have the beads hit the surface in front of the paint as the beads will only bounce from the surface. Once the paint is applied by gun assembly 31, the beads will adhere to the road surface. Furthermore, it is undesirable to have the beads hit the paint as it is sprayed because such would tend to deflect paint from its intended target and could produce markings of uneven width.

Junction box 42 directs the signals from sensor 10 to a monitor box 44. Such a box is generally located on the vehicle upon which the marking apparatus is mounted. Monitor box 44 is provided with indicator lights 40 that are illuminated when sensor 10 outputs a signal indicating an interruption in flow of glass beads.

Monitor box 44 is disposed in such a location so that indicator lights 40 are clearly visible to the operator. Usually, monitor box 44 will be mounted on the side of the vehicle upon which the marking assembly is mounted.

Figure 3:
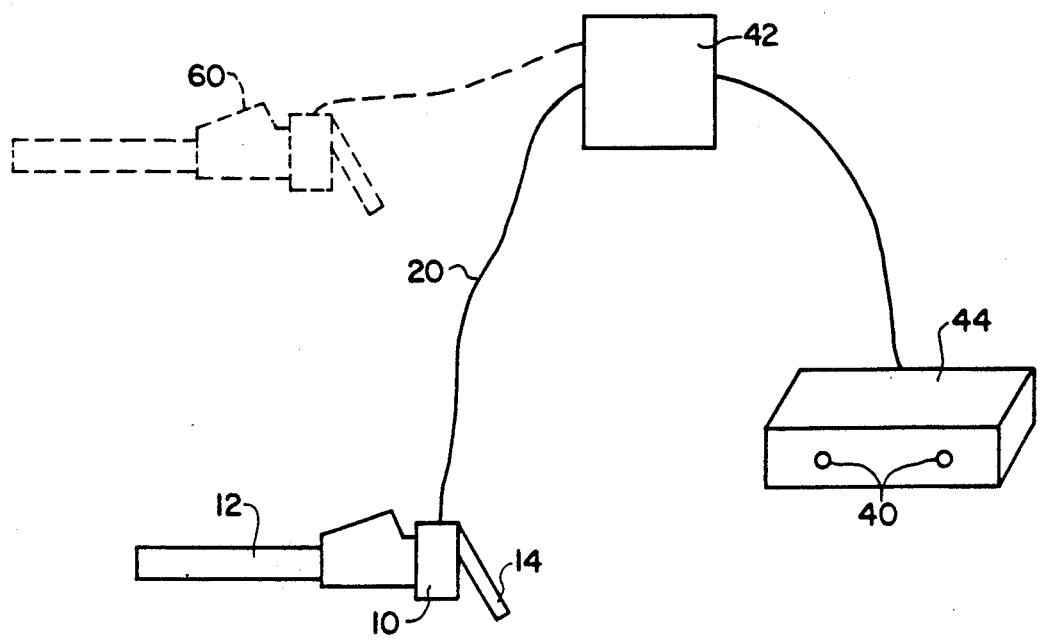
FIG. 3 is a diagrammatical illustration of the electrical connections of the present invention.

Note that in FIG. 3, two indicator lights 40 are illustrated on monitor box 44. Many marking systems are capable of simultaneously producing a plurality of markings, for example a solid line next to a dashed line. The presence of two indicator lights 40 illustrates the potential of the marking system to include more than one sensor, one for each marking unit. A marking system which makes two lines simultaneously could simply employ two systems of the type shown in FIG. 1. The dashed line in FIG. 3 depicts a second gun/sensor/reflector assembly 60.

While the present invention has been described in connection with what is presently considered to be the most practical and preferred embodiment, it is to be understood that the invention is not limited to the disclosed embodiment, but is intended to cover various modifications and equivalent arrangements included within the spirit and scope of the appended claims.

I claim:

1. An apparatus for marking a horizontal surface with a reflective material, comprising:
   means for applying a marking material to a horizontal surface;
   means for supplying reflective particles to the marking material; and
   means operatively coupled to said means for supplying the reflective particles for monitoring the supply of reflective particles and for indicating one of an interruption and a depletion of said supply.

2. An apparatus as claimed in claim 1, wherein said supplying means includes a gun assembly having an open end through which said particles are applied to the horizontal surface.

3. An apparatus as in claim 2, wherein said applying means further comprises a deflector plate coupled downstream of said open end, said deflector plate being angled so as to direct said particles toward the horizontal surface.

4. An apparatus as in claim 3, wherein said monitoring means includes an infrared sensor mounted to said gun assembly proximate said open end.

5. An apparatus as in claim 1, wherein said monitoring means includes an infrared sensor mounted to said applying means.

6. An apparatus as in claim 5, wherein said monitoring means further comprises a display means for displaying a signal produced by said infrared sensor.

7. An apparatus as in claim 1, wherein said supplying means supplies said reflective particles to said marking material after said marking material has been applied to said horizontal surface.

8. An apparatus for painting lines on roadways and applying glass beads to the painted lines, said apparatus comprising:
   a paint spray gun for jetting paint towards a roadway surface, the jetted paint being applied to the surface with a predetermined width;
   a glass bead applicator for applying glass beads to the surface painted with said spray gun;
   a sensor for monitoring a flow of glass beads through said applicator and for generating a signal when flow therethrough is interrupted; and
   an indicator responsive to the signal generated by said sensor.

9. An apparatus as in claim 8, wherein said sensor is an infrared sensor adapted to generate a signal when the flow of glass beads is interrupted.

10. An apparatus as in claim 8, further comprising a deflecting plate for directing the flow of glass beads from said applicator onto said painted surface.

11. A method for marking a horizontal surface, comprising the steps of:
    applying a marking material to the horizontal surface;
    applying reflective particles to the marking material;
    monitoring a supply of the reflective particles; and
    generating a signal when the supply of particles is interrupted.

12. A method as in claim 11, further comprising the step of displaying the signal.

13. A method as in claim 11, wherein said monitoring step includes using an infrared sensor disposed on a glass bead gun that applies the reflective particles.

14. An apparatus for supplying and monitoring the flow of reflective particles, comprising:

a glass gun for applying glass beads, said glass gun having an open end through which said glass beads flow; and an infrared sensor disposed proximate the open end for monitoring the flow of beads therethrough;

wherein said sensor generates a signal when the flow of beads is interrupted.

15. An apparatus as claimed in claim 14, further comprising a second glass gun and a second infrared sensor to monitor the flow of glass bead therethrough, said infrared sensor and said second infrared sensor being energized only when the glass gun and the second glass gun, respectively, is being used, said infrared sensor and said second infrared sensor being nonfunctional when the respective glass gun is not in use.

* * * * *